(No Model.)

M. H. BARNARD.
Stanchion.

No. 241,181. Patented May 10, 1881.

Witnesses.
John Edwards Jr.
P. J. Markley

Inventors.
Mills H. Barnard.
By James Shepard
Atty.

UNITED STATES PATENT OFFICE.

MILLS H. BARNARD, OF FORESTVILLE, CONNECTICUT, ASSIGNOR OF ONE-HALF TO ALVIN TAPLIN, OF SAME PLACE.

STANCHION.

SPECIFICATION forming part of Letters Patent No. 241,181, dated May 10, 1881.

Application filed January 10, 1881. (No model.)

*To all whom it may concern:*

Be it known that I, MILLS H. BARNARD, of Forestville, in the county of Hartford and State of Connecticut, have invented certain new and useful Improvements in Cattle-Stanchions, of which the following is a specification.

My invention relates to improvements in cattle-stanchions in which the neck-bars are hung upon a cross-piece which is mounted upon a short crank, so as to be free to swing in all directions; and the objects of my improvements are to allow greater freedom of movement to the animal within certain limits, and to avoid all rattling and noisy contrivances, also to prevent the animal from unfastening the movable neck-bar. I attain these objects by the mechanism shown in the accompanying drawings, in which—

Figure 1:
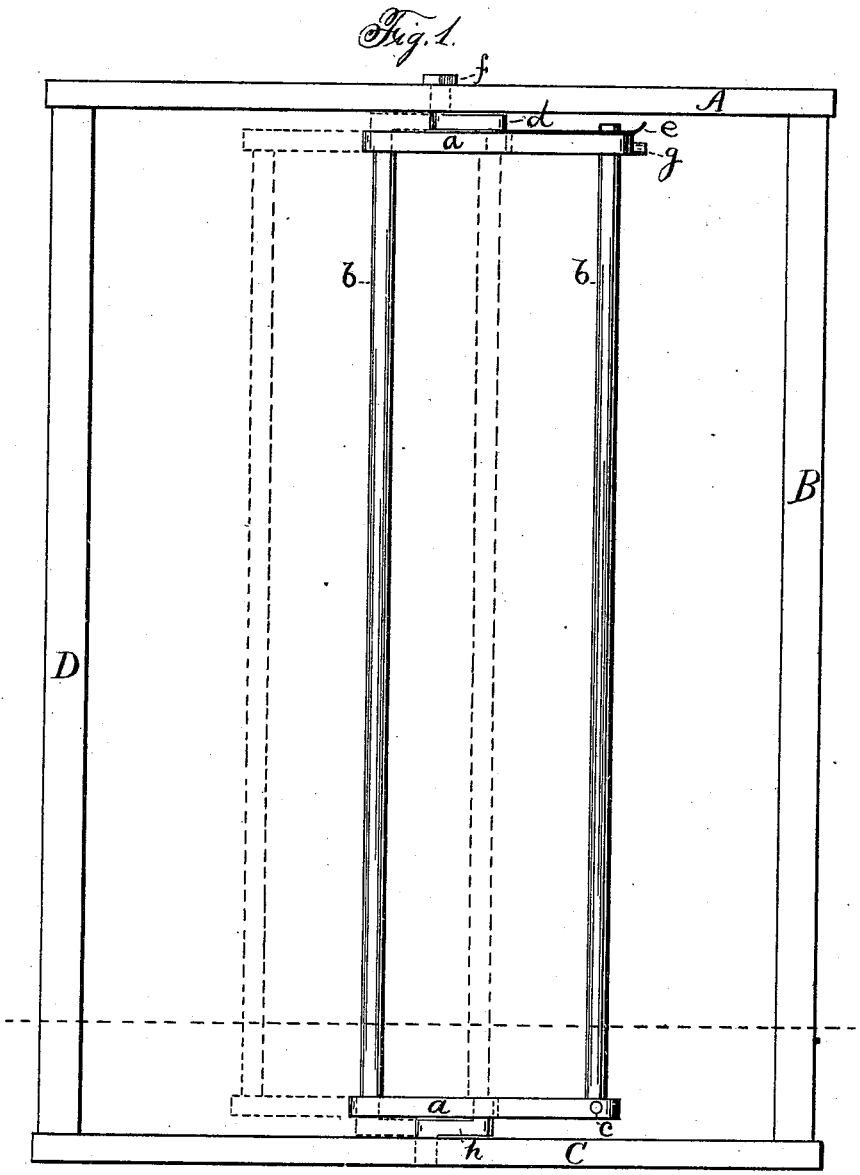
Figure 2:
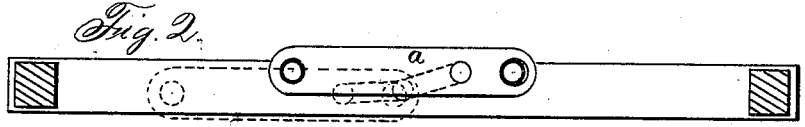
Figures 3, 4:
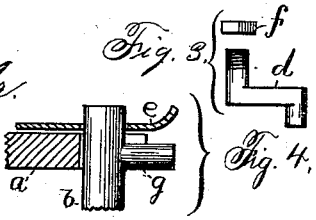

Figure 1 is a front elevation; Fig. 2, a horizontal section; Fig. 3, a detached side elevation of the crank for hanging the neck-bars; and Fig. 4 a vertical section, partly in elevation, showing one end of the upper cross-piece, neck-bar, arm, and spring.

A B C D designate the frame-work, which may be of ordinary construction.

*a a* designate the cross-pieces, to which the neck-bars are secured in any ordinary manner. As usual, one of the neck-bars is made removable at one or both of its ends to admit the animal. I prefer to make these bars of hollow or pipe iron, but they may be made of any suitable material. I secure the removable bar at its lower end by a transverse pin, *c*, upon which the bar can swing outward, as on a hinge. The upper cross-piece is slotted on the end which receives the removable bar, so as to allow said bar to swing out of and into place. A flat spring, *e*, with a hole in it, is placed on the top of the cross-piece to hold the upper end of said bar. The end of the spring *e* is bent up to form an incline to make it self-acting in closing; and in order to prevent the animal from lifting the spring with the end of its horn, I place the transverse arm or pin *g* near the end of the removable bar, so as to rest in the slotted cross-piece and come under the end of the spring, to prevent the animal from unfastening the bar. If desired, however, the removable bar might be hung in any ordinary manner.

I hang the neck-bars *b b* and cross-pieces *a a* in the frame A B C D by means of cranks *d h*, the upper one, *d*, of which is provided with a head or nut, *f*, to hold it in place. The upright shafts of both cranks are round, and enter round holes in the frame and cross-pieces, in which they are free to turn. When thus mounted the neck-bars can be moved by the animal a short distance in any direction, thereby greatly relieving the animal in its confinement, and at the same time the swinging of the cranks will not produce any disagreeable or rattling noise.

The broken lines in the drawings indicate somewhat the range of movement of the neck-bars.

Although I have described the cross-pieces as both hung upon cranks, it is evident that the crank might be applied to one end only— as, for instance, the upper end—while the lower end might be hung on a simple pivot-pin fitted loosely enough to allow the movement of the upper cross-piece; or the bottom piece might be slotted longitudinally, as shown and described in a former application filed by me.

There is generally more movement given to the bars when the creature is standing, at which time its neck will ordinarily be nearest the upper end of the bars, so that even if the lower end has the slotted cross-piece there will be but little tendency to rattle, so long as the upper end is hung by the crank, as shown.

I am aware that prior patents show stanchions with the neck-bars fixed in cross-pieces, which swing upon a pivot, in one of which patents one cross-piece is slotted to allow a forward and backward movement of the animal, while in my own application, before named, the cross-pieces are slotted, to allow a movement of the animal from side to side, all of which prior devices are hereby disclaimed.

I claim as my invention.

1. The combination of the stanchion-frame, neck-bars, cross-pieces, and cranks, substantially as described, and for the purpose specified.

2. The combination of the stanchion-frame, neck-bars, and cross-pieces with the spring $e$ and the transverse arm $g$, substantially as described, and for the purpose specified.

3. The combination of the stanchion-frame, neck-bars, one cross-piece and crank for hanging it, the opposite cross-piece, and the mechanism for hanging it to the frame, so to allow free play of the crank at the other end, substantially as described, and for the purpose specified.

MILLS H. BARNARD.

Witnesses:
ISAAC W. BEACH,
R. O. BEACH.